United States Patent Office 3,291,689
Patented Dec. 13, 1966

3,291,689
MALIC ACID AND ARGININE COMPOSITION FOR TREATING HEPATIC DYSFUNCTION
Roger Nordmann, Paris, France, assignor to Laboratoires Roques, Paris, France, a corporation of France
No Drawing. Filed June 16, 1965, Ser. No. 464,542
10 Claims. (Cl. 167—55)

This application is a continuation-in-part of copending application Serial No. 91,616, filed February 27, 1961, now abandoned.

The present invention relates to therapeutical compositions intended for the treatment of hyperammoniaemia or ammoniacal intoxication.

It is among the objects of the invention to provide a composition which is suitable as a medicament in the treatment of any conditions involving a hyperammoniaemia or ammoniacal intoxication.

It is further among the objects of the invention to provide a treatment for the above-described purposes as applied to warm blooded animals, particularly human beings.

More particularly, the invention aims at providing a therapeutical composition adapted efficiently to treat the hepatic dysfunction by acting both on the energetic disturbances and on the disorders observed in the ammoniacal metabolism, these two types of troubles resulting from an insufficient hepatic function.

As a matter of fact, it is known that among the numerous functions of the liver, two are particularly important, that is, delivering the bulk of the energy necessary for the organism, and detoxicating the nitrogenized waste through the ureogenesis process. Thus, the severe hepatic function decay originating the hepatic coma is characterized essentially by two groups of disturbances:

The decrease in oxygen consumption of the cells of certain tissues, such as brain tissue, and The increase in the level of ammonia in the blood.

The decrease in oxygen consumption is connected with the cellular respiration disorders caused by energetic alterations, the liver having an essential function in the formation of the energy-rich bonds (in the form of adenosine triphosphoric acid). Most of these energy-rich bonds are formed during the tricarboxylic acid cycle of Krebs occurring particularly at the level of the liver.

On the other hand, hyperammoniaemia reveals a failure in the detoxication process constituted by ureogenesis, during which the nitrogenized waste substances are to be detoxicated; besides, it is accompanied in some cases by a drop in the level of urea in the blood. The disorders of ureogenesis are themselves subordinate to a large extent to the energetic disturbances. In fact, the formation of urea requires carbamylphosphate, the synthesis of which requires the presence of ATP (adenosine-triphosphoric acid) as a supplier of energy-rich bonds, which ATP is regenerated by the tricarboxylic acid cycle.

The increase in ammonia concentration in the blood is followed by detrimental consequences, as ammonia represents a toxic metabolite, inhibiting many enzymatic processes. Therefore, to provide an efficient treatment of hepatic dysfunction, it is definitely necessary to counteract at the same time the energetic disturbances and the disorders in the ammonia metabolism.

For this purpose, the present invention provides a therapeutic composition comprising in combination L-arginine, an L-arginine salt of a non-toxic acid on the one hand, and malic acid on the other hand, the quantity by weight of malic acid ranging from one-third to five times the quantity of L-arginine.

It is known in this respect that malic acid, a physiological metabolite included in the tricarboxylic acid cycle, occupies a key position in this cycle, for it produces the two terms necessary for its operation: oxaloacetic acid by dehydrogenation, and pyruvic acid by oxidative decarboxylation. The synthesis of citric acid is effected from these two compounds. Moreover, the oxaloacetic acid formed from malic acid may be converted into aspartic acid by transamination.

Malic acid promotes the ureogenesis not only by acting upon the formation of energy-rich bonds through the citric acid cycle, but also by intervening indirectly in the urea cycle.

On the other hand, arginine is the most efficient agent known so far for reducing hyperammoniaemia. During experimental works performed on rats the beneficial action of L-arginine with respect to ammonia intoxication was well established.

The injection of L-arginine before the administration of a luethal dose (LD 99.9) of ammonium acetate protects all the rats, whereas all the animals of the non-protected group receiving the same dose of ammonium acetate, but without arginine, die.

The protection resulting from the use of arginine is shown not only by the survival of the animals, but also by a substantial reduction in the level of ammonia in the blood with respect to the level observed in the non-protected group of animals. On the other hand, the level of urea nitrogen rises in the rats protected by arginine, thus showing that this substance is effective in promoting the ammonia detoxication through the ureogenesis process, which can be readily understood, considering the specific function of arginine in the urea cycle.

The protective action of L-arginine is also evident with respect to the intoxication caused by the injection of a 99.9 lethal dose of a mixture of some amino acids, the addition of a moderate quantity of arginine to the mixture enabling the animals to survive. The action of arginine is obviously superior to that of any other substance tested up to now; thus, glutamate, more particularly, has no protective power even in quantities four times greater.

Thus, the action of the two component substances of the present therapeutic composition complete each other advantageously. However, these two products not only complete each other but the action of each of them is rendered more efficient by the association of the corresponding product with the other one.

This fact was evidenced by experiments carried out on rats.

A first group of experiments was undertaken to determine the influence of the association of malate with arginine on the survival of animals having received a 99.9 lethal dose of an ammonium salt. For this purpose, ammonium bicarbonate (a salt that does not alter the acid-base balance, as would ammonium chloride) was selected, the 99.9 lethal dose of this substance being by the intraperitoneal route 10.8 mmols/kg. of weight.

Three groups of each 10 animals were subjected to the experiment. The rats of the first group received only the injection of ammonium bicarbonate, this injection being preceded by the administration of 1 mmol/kg. of L-arginine in the animals of the second group and by the administration of the combination of L-arginine (1 mmol/kg.) with sodium malate (5 mmols/kg.) in those of the third group.

While all the animals of the first and second groups die within one hour after the administration of ammonium bicarbonate, 70% of the rats of the third group survive. Thus, it appears that the combination of malate (5 mmols/kg.) with a non-protective dose of L-arginine (1 mmol/kg.) is capable of reducing to a very important extent the mortality due to acute ammonia intoxication.

This result led to another phase in which the influence of the malate-arginine combination on hyperammoniaemia resulting from the administration of ammonium bicarbonate was studied. In this case also, three groups of animals were compared; a first or control group received only the ammonium salt at the 99.9 lethal dose, the other two receiving beforehand L-arginine alone and the association of L-arginine with malate, respectively.

The experiments were carried out, this time, by using a protective dose of L-arginine (3 mmols/kg. of weight) in order to investigate whether the addition of malate to this quantity of arginine gave equal to or better results than that of arginine alone.

The animals of the second group thus received—one hour before the injection of ammonium bicarbonate—3 mmols/kg. of L-arginine, those of the third group the combination of L-arginine (3 mmols/kg.) with malate (5 mmols/kg.). All the animals were killed ten minutes after the injection of ammonium bicarbonate. The ammonia content of the blood was measured according to the microdiffusion technique of E. J. Conway. The statistical comparison of the results showed that the protective action of the combination of malate with arginine against hyperammoniaemia is considerably higher than that of arginine alone.

These tests thus proved that the two compounds of the combination had a real synergic action as evidenced by the reduction in the mortality figure when associating malate with nonprotective doses of arginine, and by the statistical comparison of the ammoniaemia of rats protected by the arginine/malate combination with that of a group of animals protected by arginine alone.

Human beings were treated with the present composition and the beneficial results obtained were similar to those obtained with the above-indicated experimental animals. Attention is directed to the article by M. Cachin in La Presse Medicale, vol. 69, No. 32, July 1, 1961, pages 1473–1475, wherein clinical results are described.

The therapeutical composition of this invention may be prepared in different forms, such as tablets or sugar-coated pills to be administered by the oral route, or as a liquid drinkable solution, or as a solution injectable by subcutaneous injection or intravenous injection or perfusion.

The following are specific examples of the therapeutical composition according to this invention.

*Example 1*

A therapeutical composition in the form of granules to be administered orally:

To prepare this composition, L-arginine hydrochloride is intimately mixed with sodium bicarbonate and sugar. Water and alcohol are added to penetrate the mixture. Then malic acid is added. The ingredients are thoroughly mixed, then reduced into granules and dried.

The following proportions were used:

| | Grams |
|---|---|
| L-arginine hydrochloride | 50 |
| Malic acid | 150 |
| Sodium bicarbonate | 170 |
| Sugar | 700 |

These components make an initial weight of 1,070 grams, the 70 grams of sugar excess being added to compensate for the loss of $CO_2$ during the preparation.

This preparation, in spite of the presence of sodium bicarbonate, has a very acid taste and it may be advisable notably in pediatrics to neutralize the malic acid with lime. In this case the granules are prepared according to the following formula:

| | Grams |
|---|---|
| L-arginine hydrochloride | 50 |
| Calcium malate | 200 |
| Sugar | 750 |
| Super-Lantier mandarine oil | 1 |

To prepare this composition, the arginine hydrochloride is intimately mixed with the sugar, the mix being subsequently humidified with water and alcohol, calcium malate and then mandarine oil are added. The assembly, after being thoroughly mixed, is reduced into granules and then dried.

One tablespoon of granules of one or the other formula contains about .50 gram of L-arginine HCl, and 1.50 grams of malic acid.

However, the proportion of the component elements may differ from the values given hereinabove. As a rule, the amount of malic acid by weight is from about $\frac{1}{3}$ to 5 times that of L-arginine hydrochloride.

*Example 2*

Therapeutical composition in the form of syrup to be administered orally:

To prepare this composition malic acid and L-arginine hydrochloride are dissolved in nearly the whole of the sugar syrup heated beforehand to 65°–70° C. Then a 1% solution of tartrazine yellow is added. The mix is allowed to cool, and 95° alcohol and soluble lemon oil are added to the mixture in which the methyl ester of p-hydroxybenzoic acid and the propyl ester of p-hydroxybenzoic acid have been dissolved. This addition is effected very slowly while stirring continuously. The final volume is completed by the addition of sugar syrup. The mixture is homogenized and finally filtered.

The following proportions are used:

| | | |
|---|---|---|
| L-arginine hydrochloride | grams | 40 |
| Malic acid | do | 120 |
| 1% tartrazine yellow solution | do | 0.05 |
| Soluble lemon oil at 70° MB | cc | 3 |
| 95° ethyl alcohol | cc | 5 |
| Methyl ester of p-hydroxybenzoic acid | gram | 0.8 |
| Propyl ester of p-hyroxybenzoic acid | do | 0.2 |
| Sugar syrup, q.s. to make 1,000 cc. | | |

In this formula, a 70% aqueous sorbitol solution may be substituted for the sugar syrup.

One teaspoon of this syrup contains about .25 gram of L-arginine HCl and .75 gram of malic acid. Of course, these proportions may differ, the quantity by weight of malic acid remaining in general within the limits of from $\frac{1}{3}$ to 5 times the quantity of L-arginine hydrochloride.

*Example 3*

Therapeutical composition in the form of a liquid solution for drinkable ampoules.

This composition is prepared by disolving on the one hand the malic acid and the L-arginine hydrochloride in 150 cc. of distilled water at 60°–70° C. and on the other hand sugar in grapefruit juice. 20 cc. ampoules are filled and then tyndallized at 80° C.

The following proportions are used:

| | For 1,000 cc. | For a 20 cc. ampoule |
|---|---|---|
| L-arginine hydrochloride | 25 grams | 0.5 gram. |
| Malic acid | 75 grams | 1.5 grams. |
| Sugar | 300 grams | 6.0 grams. |
| Distilled water | 150 cc. | 3.0 cc. |
| Grapefruit juice, q.s. to make | 1,000 cc. | 20.0 cc. |

These proportions may differ, the quantity by weight of the malic acid remaining within the range of from $\frac{1}{3}$ to 5 times that of L-arginine hydrochloride. The grapefruit juice may be replaced by any other fruit juice (orange, apple, etc.).

*Example 4*

Therapeutical composition in the form of tablets to be administered orally:

L-arginine hydrochloride is intimately mixed with malic acid, lactose and sugar. The mix is wetted, then reduced into granules and dried at low temperature. Starch and magnesium stearate are then added while mixing thoroughly.
The mix is then compressed into tablets.
The following proportions are used:

|  | Gram |
|---|---|
| L-arginine HCl | 0.12 |
| Malic acid | 0.36 |
| Lactose | 0.10 |
| Sugar | 0.01 |
| Corn starch, magnesium stearate, q.s. to make 0.60 gram. | |

Other proportions may be used, the quantity by weight of malic acid being of from ⅓ to 5 times that of L-arginine hydrochloride.

*Example 5*

Therapeutical composition in the from of sugar-coated pills to be administered orally:
The core of the pills is prepared according to the same method as for the tablets, and the pills are subsequently coated.

Core:

|  | Gram |
|---|---|
| L-arginine HCl | 0.06 |
| Malic acid | 0.18 |
| Lactose | 0.05 |
| Sugar | 0.005 |
| Wheat starch, magnesia stearates, q.s. to make 0.30 gram. | |

Coating:
Varnish with rosin, gum lac, oil of turpentine
Powdering with talc, starch
Mixed coating with—

| Sugar | 70% |
|---|---|
| Talc | 30% |
| Gelatin | Traces |
| White wax | Traces | for a final weight of 0.60 gram.

As in the preceding examples, the proportions may differ from those given hereinabove, the quantity by weight of malic acid remaining in the range of from ⅓ to 5 times that of the L-arginine hydrochloride.

*Example 6*

Therapeutical composition in the form of a liquid solution for subcutaneous injection:
L-arginine base and malic acid are dissolved in seven-tenths of the distilled water.
The mix is stirred in the cold state. The pH is brought to 7.35 by adding slowly and gradually pure sodium hydroxide diluted beforehand by ½ with water. The mix is stirred and completed to the requisite volume. The liquid solution thus obtained is poured into 10 cc. ampoules which are subsequently sterilized at 110° C. for twenty minutes.
The following proportions are used:

|  | For 1,000 cc. | For one 10 cc. ampoule |
|---|---|---|
| L-arginine base | 70 grams | 0.7 gram. |
| Malic acid | do | Do. |
| Sodium hydroxide, q.s. to obtain | pH=7.35 | |
| Distilled water, q.s. to make | 1,000 cc | 10 cc |

The proportions of the various components may differ from those given hereinabove, the quantity by weight of the malic acid remaining in the range of ⅓ to 5 times that of basic L-arginine.

*Example 7*

Therapeutical composition in the form of a liquid solution to be injected by intravenous perfusion or injection:
The product is prepared according to the same method as for the ampoules of solution for subcutaneous injection. A non-toxic alkali metal hydroxide or metal hydroxide is used to obtain the proper pH for the injection.
The following proportions are used:

|  | For 1,000 c.c. | For 250 c.c. |
|---|---|---|
| L-arginine base | 16.8 grams | 4.2 grams. |
| Malic acid | 17.5 grams | 4.375 grams. |
| Sodium hydroxide, q.s. to bring the pH to | 7.35 | |
| Distilled water, q.s. to make | 1,000 c.c. | 250 c.c. |

As in the preceding example, the proportions may vary, but the quantity by weight of malic acid remains in the range from ⅓ to 5 times that of L-arginine base.

The therapeutical composition according to this invention has particularly active properties in the treatment of following conditions:

(a) In the treatment of ammoniacal intoxication it was observed that considerable results were obtained by administering the composition of this invention orally. In this respect the composition may be used either in the solid state, that is: granules (Example 1), tablets (Example 4), sugar-coated pills (Example 5), or in the liquid form: syrup (Example 2), drinkable solution in ampoules (Example 3).

Thus, in the last case, good results are obtained by administering every day 2 to 3 drinkable ampoules (of 20 cc. each) according to Example 3, these ampoules being taken before meals.

This treatment may last a fortnight in the average. When needed, it may be continued without any inconvenience during longer periods.

(b) In the treatment of Hyperammoniaemia, it was observed that considerable improvement was obtained by administering to the patients the composition according to this invention in the form of intravenous injection of the liquid solution described in Example 6.

This treatment gives very good results in all cases where ammoniaemia is abnormally elevated.

(c) In the treatment of hepatic coma, it was observed that very good results were obtained by administering the therapeutical composition of this invention in the form of venous perfusion, this composition being used either separately or in combination with a cortisonic derivative.

In this case the composition described in Example 7, that is in the form of a liquid solution, is used. The usual average does to be used comprises four 250 cc. bottles per day, injected as slow perfusions. These perfusions should be continued until the patient has again become completely conscious and the neurological signs of hepatic coma have disappeared completely. Then the treatment should be continued by administering to the patient the composition of this invention in the form of a drinkable solution, for example the solution described in Example 3. The daily dose to be administered may be initially of 10 ampoules of each 20 cc., then 1 to 3 ampoules as a maintenance dose.

The action exerted by the composition of this invention on the hyperammoniaemia which had been proved by experimentation, is found in most clinical cases. In those cases where the nervous accidents of severe hepatic disorders are ascribable directly to the ammonia intoxication, the results obtained are most remarkable and sometimes spectacular.

In any case, arginine-malate seems up to now to be the best treatment for hepatic coma and should be used systematically in this pathological condition.

(d) Very advantageous results have also been observed in all cases involving a hyperammoniaemia: The anti-fatigue action of the composition of this invention is further improved by the energy imparted to the patient by the absorption of malic acid.

(e) It has also been observed that by associating the composition of this invention with nitrogen-containing solutions (protein hydrolysates, amino acids) in the artificial nutrition of patients, this composition will avoid the accidents due to hyperammoniaemia caused by such solutions.

What is claimed is:

1. A method for treatment of hepatic ammonia intoxication in warm blooded animals comprising the administration internally in said animals of an effective amount of a mixture of L-arginine and malic acid, the amount of malic acid by weight being at least about one-third of the amount of arginine.

2. A method according to claim 1 wherein the amount of malic acid by weight is from about ⅓ to 5 times that or arginine.

3. A method according to claim 1 wherein said arginine is in the form of a salt of a non-toxic acid.

4. A method according to claim 3 wherein said arginine is in the form of the hydrochloride.

5. A method according to claim 1 wherein said mixture is in the form of a drinkable solution containing arginine hydrochloride, malic acid, sugar and water.

6. A method according to claim 1 wherein said mixture is an injectable solution containing arginine, malic acid and sufficient non-toxic metal hydroxide to obtain a pH suitable for intravenous administration.

7. A method according to claim 1 wherein said mixture is an injectable solution containing arginine, malic acid and adjusted to obtain a pH suitable for intravenous injection.

8. A method according to claim 1 wherein starch and magnesium stearate are present.

9. A method according to claim 7 wherein said compound is alkali metal hydroxide in sufficient amount to provide a pH suitable for injection.

10. A composition for internal administration in warm blooded animals comprising in an amount effective for treating hepatic ammonia intoxication a mixture of L-arginine and malic acid, the amount of malic acid by weight being at least about one-third of the amount of arginine.

No references cited.

SAM ROSEN, *Primary Examiner.*